March 4, 1947.  F. A. GALLAHER  2,416,826
EXCAVATOR APPARATUS
Filed Dec. 3, 1945
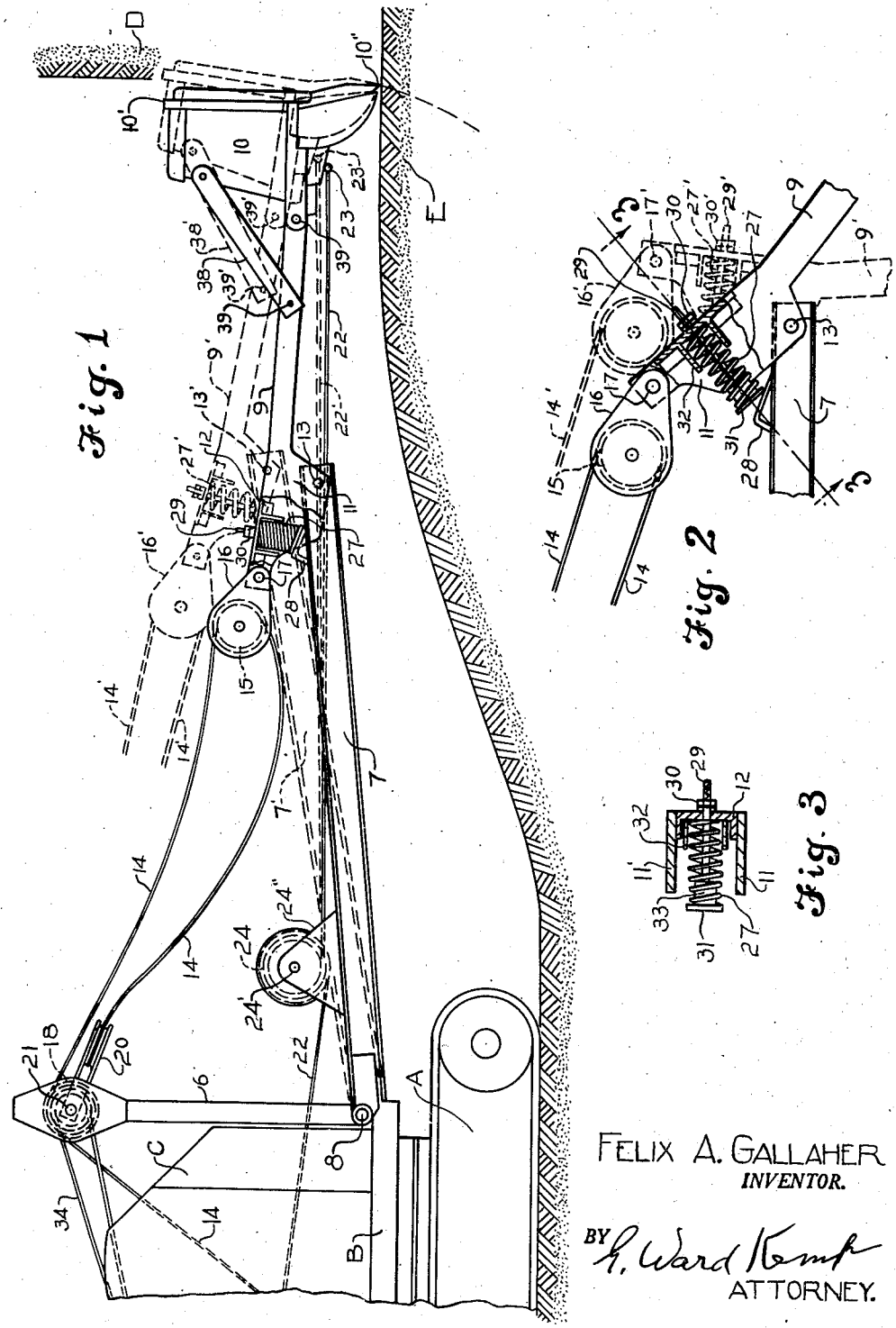
FELIX A. GALLAHER
INVENTOR.
BY G. Ward Kemp
ATTORNEY.

Patented Mar. 4, 1947

2,416,826

UNITED STATES PATENT OFFICE 2,416,826

EXCAVATOR APPARATUS

Felix A. Gallaher, Seattle, Wash., assignor to William J. Gallaher, Seattle, Wash.

Application December 3, 1945, Serial No. 632,404

4 Claims. (Cl. 214—138)

1

This invention relates to excavators for digging trenches and cutting vertical walls, and particularly to means for preventing dead centers between the drag lines of the hoes and the shaft connecting the hoe handle to the boom.

In the operation of excavators of the type for cutting downward and inward toward the source of power and for cutting down vertical on the face of a bank particularly it is important that the point of the hoe should extend outward beyond the top of the ordinary bucket to prevent the top of the bucket from striking the vertical wall above the hoe when the same is lowered for such vertical cutting. It is important also that the hoe and handle be extended as far out longitudinally as possible for digging trenches in order to avoid frequent shifting to new locations of the ordinary supporting tractor.

Attempts have been made to provide for such extensions of the hoe by connecting the hoisting boom and hoe handle eccentrically to raise the point of the hoe and the outer end of the handle but in such cases when the hoe is so extended laterally the greatest distance possible upon a surface to be dug, the outer connection of the drag line to the hoe will ordinarily be disposed on a dead center with the shaft thereby preventing the drag line from drawing in the hoe and frequently resulting in the breaking of such drag lines when attempts are made to so draw in and draw down the hoe into the earth beneath.

It is therefore among the objects of this invention to so connect the hoisting boom and hoe handle so that the hoe can be lowered by gravity for cutting down vertically along the face of a bank and also so that the hoe can be drawn down into the earth when fully extended parallel with the boom. A particular object is to provide resilient means for automatically adjusting the position of the connecting shaft between the boom and the handle so that when the hoe and handle are fully extended horizontally upon the earth that the drag line may be operated and the hoe drawn down into the earth and back toward the source of power.

With these and other objects to be hereinafter stated I have illustratively exemplified my invention by the accompanying drawings of which:

Figure 1 is a vertical elevation of the assembled excavator showing the boom and handle extended horizontally and the hoe supported on the earth to be dug and the drag line approximately on the same plane as the position of the connecting shaft or pivot between the outer end of the boom and inner portion of the hoe handle,

2

Figure 2 shows an enlarged fragmentary detail of the adjacent ends of the boom and hoe handle connected by the shaft and a helical spring expanded for spacing the adjacent portions of the stick and handle and elevating the shaft, with dotted lines indicating the position of the handle when the hoe is partially drawn in toward the source of power; Figure 3 is an enlarged detail view in section showing the method of mounting the spring, taken on line 3—3 of Fig. 2.

Like characters on the different figures represent like parts.

An ordinary tractor is indicated at A with a rotatable platform B and is provided with an ordinary cab C. Numeral 6 represents an ordinary gantry pole or jib frame substantially perpendicular, to which the inner end of the operating boom 7 is connected by pivot 8 to permit the boom to be raised and lowered in use. A handle or stick represented by 9 for operating a hoe 10" and bucket assembly 10 is pivotally connected to the boom. In most constructions the stick is formed of two parallel rails of identical shape and spaced apart preferably on the same plane. At a suitable distance from the top or inner end of the stick the rails are widened as indicated at 11 and 11' extended downward to provide leverage and through which a supporting pivot or shaft 13 is passed for connection to the outer end of the boom to provide for swinging movement of the stick and operation of the hoe on the outer end thereof. Both the boom and stick are simultaneously raised by a hoisting cable 14 disposed over a sheave 15 freely mounted from the top or inner end of the stock by yoke 16 connected by pivot 17. The upper bight of the cable is extended over another free sheave 18 on a shipper shaft 21 through the top of the gantry 6 and then to a winding drum or clutch 19 attached to the cab platform for drawing the top of the stick inward upon the boom and raising the assembly of the hoe and boom. The other end of the cable is attached by a yoke or pulley to the cab.

The hoe is drawn downward and into the earth for excavating and loading any suitable bucket attached thereto, by a drag line 22 attached at the outer end to a ring or lug 23 at a suitable point on the hoe and thence brought inward over any suitable drum or clutch which may be mounted in the usual manner but operated independently from the clutch provided for hoisting cable 14.

In order to maintain the line 22 in suitable elevated position while the hoe is operated, it is passed once around a free pulley 24 mounted on a bracket 24' supported on the boom.

In operation for cutting downward vertically to leave a vertical wall indicated by D, the point of the hoe must be extended beyond the upper corner 10' of the bucket for freedom and to prevent the bucket from scraping the wall and therefore and for other economic reasons the ends of the boom and handle are connected by the pivot shaft 13 eccentrically disposed beneath the handle to tip the bucket top inward and the hoe outward. For such vertical cutting the boom and hoe are elevated by line 14 to the proper height and then the line 14 is slackened and the hoe allowed to descend by gravity along a surface to be cut.

When the hoe is to be used for digging into the surface of the ground for trenches, etc. it is preferably extended as far as possible and lowered upon the surface of the ground indicated as E, and as seen in Figure 1 and the line 14 slacked off. The hoe must then be drawn downward and inward by the drag line but the eccentric position of the shaft would normally be in an approximate line with the point 23 on the hoe for the drag line, the other end of the drag line being controlled over sheave 24. Thus the connecting pivot shaft is approximately on a dead center between the two ends of the drag line so that the line cannot be operated in such position for drawing down the hoe.

In order to automatically overcome this difficulty and elevate the pivot shaft and inner end of the handle a relatively powerful and preferably helical spring 27 is disposed between the adjacent ends of the handle and boom. This spring is normally collapsed when line 14 draws in the top of the handle upon the outer end of the boom and remains collapsed in operation and when the hoe is lowered upon the ground in position for digging; but immediately upon the release of the stress from cable 14 the resiliency of the spring 27 forces the inner end of the handle upward whereby the shaft is raised to a point 13' above the position of the drag line 22, thus breaking the dead center so that the operator may readily draw in the hoe and force the same downward into the ground for digging.

A preferred method for assembling the spring in position is best seen in Figure 2 by the application of a cross brace or plate 12 which serves also for unifying and suitably spacing the rails and flanges 11 and 11'. The particular object of the plate 12 is for a seat for the spring 27. A guide bolt 29 is slidably disposed through the plate and through the spring and retained by a nut 30 above the plate and a head cap 31 over the lower end of the spring. The spring is prevented from lateral movement by an embracing socket 32 carried by the plate, and a bushing 33 inside the spring also attached to the cap. Sufficient space is provided between the bushing and the socket to permit the necessary closing of the coils of the spring when a stick is drawn down upon it. In cases where the stick is formed of a single rail the spring may be similarly mounted on a bolt slidably positioned through the rail so that the spring will be in a position for striking the buffer block 28.

Having described my invention, I claim:

1. An excavating apparatus including a hoisting boom, a digging hoe, a stick connected to the hoe and having offset connection to the end of the boom, a cable to be operatively connected to the rear end of the stick above the junction of the boom therewith, a member connected to the end of the cable and pivotally connected to the stick in rear of the pivotal connection of the stick and boom to draw the top of the stick for facilitating movement of the hoe for digging downwardly, a drag line for drawing the hoe downwardly and operating in line with the pivot between the pivot between the boom and stick, and a coil spring operating between the boom and stick in rear of the pivot between the parts for moving the hoe for downward digging, said spring being automatically extended when the cable is slackened to move the rear end of the stick to space the rear end of the stick relative to the boom to remove the drag line out of direct-line connection with the stick carrying end of the hoe to avoid hoe to facilitate operation of the drag line.

2. A construction as defined in claim 1, wherein the boom is provided with a rest for one end of the spring, the offset end of the stick be formed with spaced downwardly projections to house the opposite end of the spring, the spring being at an upward inclination from the boom.

3. A construction as defined in claim 1, wherein the spring is compressed when the boom and stick are in substantial line and extended through its own resiliency when the stick is in downward hoe digging movement under the operation of the drag line.

4. A construction as defined in claim 1, wherein the cable is connected to a pulley mounted in a yoke pivotally connected to the rear end of the stick rearwardly of the spring and of the pivot between the stick and boom.

FELIX A. GALLAHER.

REFERENCES CITED

The following references are of record in the file of this patent:

UNITED STATES PATENTS

| Number | Name | Date |
| --- | --- | --- |
| 1,783,056 | Russell | Nov. 25, 1930 |
| 1,832,911 | Mitchell | Nov. 24, 1931 |
| 1,962,516 | Mitchell | June 12, 1934 |